United States Patent
Liu et al.

(10) Patent No.: US 9,634,923 B2
(45) Date of Patent: Apr. 25, 2017

(54) METHOD, APPARATUS AND SYSTEM FOR DISSEMINATING ROUTING INFORMATION

(71) Applicant: Tencent Technology (Shenzhen) Company Limited, Shenzhen (CN)

(72) Inventors: Xianbin Liu, Shenzhen (CN); Jiuzhou Che, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/176,032

(22) Filed: Jun. 7, 2016

(65) Prior Publication Data

US 2016/0323175 A1   Nov. 3, 2016

Related U.S. Application Data

(63) Continuation of application No. PCT/CN2014/094816, filed on Dec. 24, 2014.

(30) Foreign Application Priority Data

Jan. 8, 2014 (CN) .......................... 2014 1 0008919

(51) Int. Cl.
*H04L 12/751* (2013.01)
*H04L 12/64* (2006.01)
*H04L 12/733* (2013.01)

(52) U.S. Cl.
CPC .......... *H04L 45/02* (2013.01); *H04L 12/6418* (2013.01); *H04L 45/122* (2013.01)

(58) Field of Classification Search
CPC .... H04L 12/6418; H04L 45/02; H04L 45/122
See application file for complete search history.

(56) References Cited

U.S. PATENT DOCUMENTS 8,554,137 B2* 10/2013 Wyper ................. H04W 88/06
                                                       455/41.2
2005/0014510 A1* 1/2005 Jeon ....................... H04L 45/00
                                                       455/452.2
(Continued)

FOREIGN PATENT DOCUMENTS

CN   101989986 A   3/2011
CN   102668518 A   9/2012

OTHER PUBLICATIONS

Tencent Technology, IPRP, PCT/CN2014/094816, Jul. 12, 2016, 5 pgs.

(Continued)

*Primary Examiner* — Khaled Kassim
(74) *Attorney, Agent, or Firm* — Morgan, Lewis & Bockius LLP

(57) ABSTRACT

A method for disseminating routing information includes receiving values of network quality parameters indicating a level of network quality among a set of acceleration nodes and between the set of acceleration nodes and a set of service nodes. The method further includes designating an acceleration node as a source node and designating a service node as a destination node, and then determining, based on the values of network quality parameters and from the set of acceleration nodes, a series of intermediate hop nodes connecting the source node and the destination node. The method includes generating routing information associated with a routing path from the source node to the destination node via the intermediate hop nodes. The routing information is disseminated to the source node and the intermediate hop nodes such that data can be forwarded from the source node to the destination node according to the routing path.

16 Claims, 6 Drawing Sheets

(56) References Cited

U.S. PATENT DOCUMENTS

| | | | | |
|---|---|---|---|---|
| 2007/0002792 A1* | 1/2007 | Twitchell, Jr. | .......... | H04W 40/12 370/328 |
| 2007/0274320 A1* | 11/2007 | Joshi | .............. | H04L 45/302 370/395.2 |
| 2008/0008162 A1* | 1/2008 | Martinez | ............ | H04L 45/12 370/352 |
| 2009/0059814 A1* | 3/2009 | Nixon | ............. | H04L 41/12 370/254 |
| 2010/0232440 A1 | 9/2010 | Basavaiah et al. | | |
| 2011/0149844 A1* | 6/2011 | G. | .................. | H04L 45/122 370/328 |
| 2014/0337838 A1* | 11/2014 | Hyde | ............ | H04W 76/023 718/1 |

OTHER PUBLICATIONS

Tencent Technology, ISRWO, PCT/CN2014/094816, Mar. 24, 2015, 7 pgs.

* cited by examiner

100

S102
A routing computation node receives, from a set of acceleration nodes, values of a group of network quality parameters indicating a level of network quality among the set of acceleration nodes and between the set of acceleration nodes and a set of service nodes; the routing computation node generates, based on the values of the group of network quality parameters, routing information associated with routing paths from the set of acceleration nodes to the set of service nodes via the set of acceleration nodes S104
A routing dissemination node retrieves the generated routing information from the routing computation node, and disseminates the retrieved routing information to the set of acceleration nodes S106
The set of acceleration nodes receive service data destined to the set of service nodes, and forward the service data to the destined service node from the set of service nodes based on the routing information received from the routing dissemination node

FIG. 1

METHOD, APPARATUS AND SYSTEM FOR DISSEMINATING ROUTING INFORMATION

RELATED APPLICATIONS

This application is a continuation application of PCT Patent Application No. PCT/CN2014/094816, entitled "METHOD, APPARATUS AND SYSTEM FOR DISSEMINATING ROUTING INFORMATION" filed on Dec. 24, 2014, which claims priority to Chinese Patent Application Serial No. 201410008919.5, entitled "Method, Apparatus and System for Routing and Disseminating Routing Information," filed on Jan. 8, 2014, both of which are incorporated herein by reference in their entirety.

TECHNICAL FIELD

The present application generally relates to the field of networking technologies, and more particularly to a method and related apparatus and system for generating and disseminating routing information.

BACKGROUND

To implement a network application (e.g., an instant messaging application, a social networking application, an online gaming application, etc.) in a large-scale network (e.g., the Internet), some known networking systems deploy service nodes distributed at various geographic locations to process service requests initiated by terminal devices from the corresponding geographic areas. When interaction between terminal devices from different geographic areas is needed, the service nodes deployed at the corresponding geographic locations will communicate with each other. To improve communication quality among the service nodes, the known networking systems typically deploy multiple acceleration nodes in the network to forward data transmitted among the service nodes. Furthermore, with the increase of the size of the network and the number of the service nodes, a series of multiple acceleration nodes can be used to forward data between two service nodes in a hop-by-hop manner.

The known networking systems, however, typically do not promptly update routing information that is used to select a next-hop acceleration node, thus often causing the same acceleration node to be selected as the next hop in a routing path. As a result, the known networking systems often continue using the same communication links to forward data even after communication quality of those links are deteriorated, thus causing poor performance in data transmission in the network.

Therefore, a need exists for a method, apparatus and system that can enable timely dissemination and update of routing information among service nodes and acceleration nodes to improve communication quality of a large-scale network.

SUMMARY

The above deficiencies associated with the known networking systems may be reduced or eliminated by the techniques described herein.

In some embodiments, a method for disseminating routing information is disclosed. The method is performed at a computer system having one or more processors and memory for storing programs to be executed by the one or more processors. The method includes receiving, from a set of acceleration nodes, values of a group of network quality parameters indicating a level of network quality among the set of acceleration nodes and between the set of acceleration nodes and a set of service nodes. In some instances, the group of network quality parameters includes, for example, at least one of a delay parameter and a packet loss rate parameter.

The method includes designating an acceleration node from the set of acceleration nodes as a source node and designating a service node from the set of service nodes as a destination node. In some instances, the method includes detecting abnormal behavior of acceleration nodes from the set of acceleration nodes. In such instances, the designating the acceleration node as the source node can include designating the acceleration node as the source node based on a detection of abnormal behavior of the acceleration node.

The method includes determining, based on the values of the group of network quality parameters and from the set of acceleration nodes, a series of intermediate hop nodes connecting the source node and the destination node. The method also includes generating routing information associated with a routing path from the source node to the destination node via the series of intermediate hop nodes. In some instances, the method includes obtaining information of rated load at the set of acceleration nodes and bandwidth of the set of acceleration nodes. In such instances, the determining the series of intermediate hop nodes includes determining the series of intermediate hop nodes based on the information of rated load and bandwidth.

The method further includes disseminating the routing information to the source node and each intermediate hop node from the series of intermediate hop nodes such that the source node and each intermediate hop node from the series of intermediate hop nodes forward data to the destination node according to the routing path.

In some instances, after designating the acceleration node from the set of acceleration nodes as the source node, the method includes repeatedly performing the above operations for each service node from the set of service nodes, such that routing information associated with routing paths connecting the source node to each service node from the set of service nodes is updated based on the values of the group of network quality parameters.

In some embodiments, a system is configured to disseminate routing information. The system includes a routing computation node, a routing dissemination node, and a set of acceleration nodes. The routing computation node, the routing dissemination node and the set of acceleration nodes are collectively configured to perform the method for disseminating routing information as described above.

Specifically, the routing computation node is configured to receive, from the set of acceleration nodes, values of a group of network quality parameters indicating a level of network quality among the set of acceleration nodes and between the set of acceleration nodes and a set of service nodes. The routing computation node is also configured to generate, based on the values of the group of network quality parameters, routing information associated with routing paths from the set of acceleration nodes to the set of service nodes via the set of acceleration nodes, where the routing paths include multiple intermediate hops.

The routing dissemination node is configured to retrieve the generated routing information from the routing computation node. The routing dissemination node is also configured to disseminate the retrieved routing information to the set of acceleration nodes. The set of acceleration nodes are configured to receive service data destined to the set of service nodes. The set of acceleration nodes are also configured to forward the service data to the destined service node from the set of service nodes based on the routing information received from the routing dissemination node.

In some embodiments, an apparatus configured to disseminate routing information is disclosed. The apparatus is operatively coupled to a set of acceleration nodes in a network. The apparatus includes a receiving module, a routing computation module, and a routing dissemination module. The receiving module, the routing computation module and the routing dissemination module are collectively configured to perform the method for disseminating routing information as described above.

Specifically, the receiving module is configured to receive, from the set of acceleration nodes, values of a group of network quality parameters indicating a level of network quality among the set of acceleration nodes and between the set of acceleration nodes and a set of service nodes. The routing computation module is configured to generate, based on the values of the group of network quality parameters, routing information associated with routing paths from the set of acceleration nodes to the set of service nodes via the set of acceleration nodes, where the routing paths include multiple intermediate hops. The routing dissemination module is configured to disseminate the generated routing information to the set of acceleration nodes.

Various advantages of the present application are apparent in light of the descriptions below.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

FIG. 1 is a flowchart illustrating a method for disseminating routing information in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In order to make the objectives, technical solutions, and advantages of the present application comprehensible, embodiments of the present application are further described in detail below with reference to the accompanying drawings.

Figure 2:
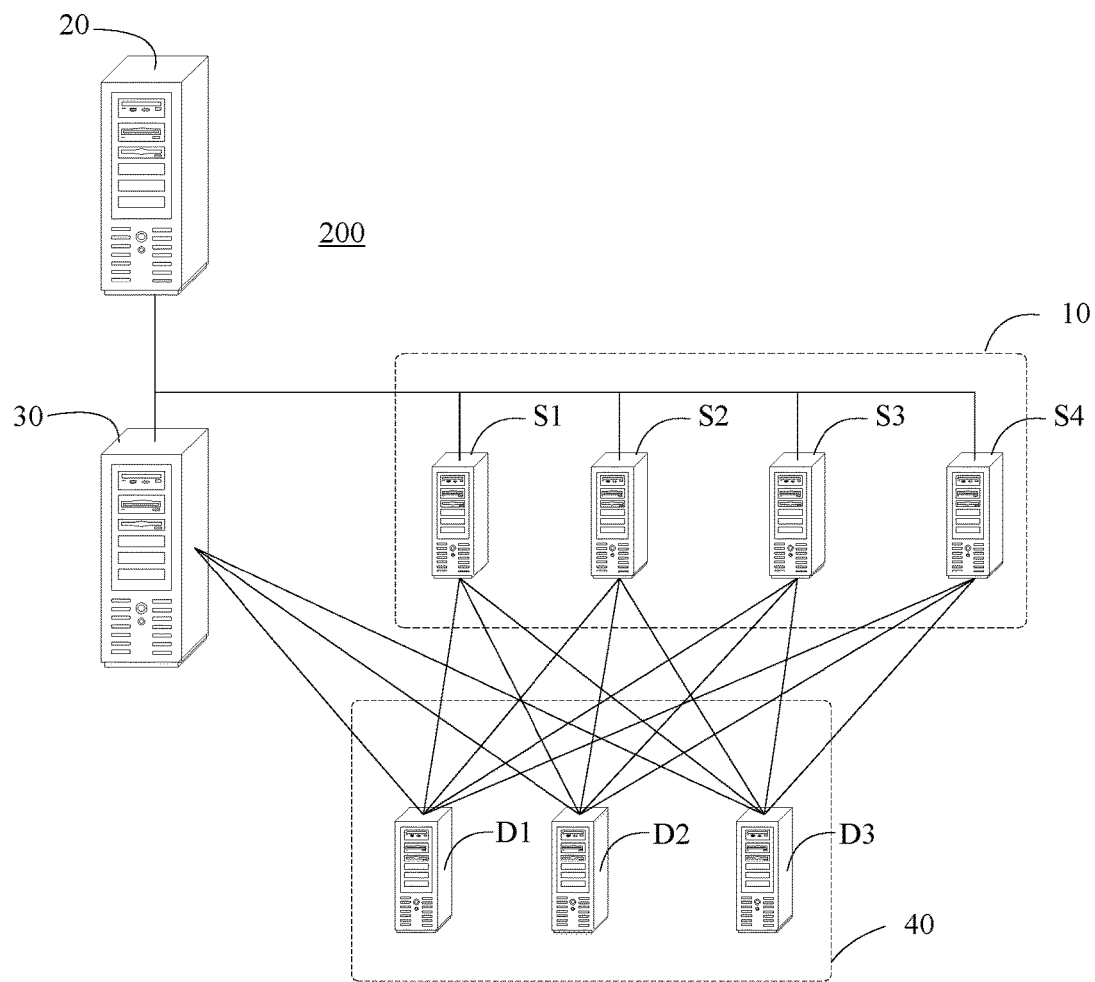
FIG. 2 is a schematic diagram illustrating a system configured to disseminate routing information in accordance with some embodiments.

FIG. 1 is a flowchart illustrating a method 100 for disseminating routing information in accordance with some embodiments. The method 100 can be performed at a system or an apparatus configured to generate and disseminate routing information in a network. FIG. 2 is a schematic diagram illustrating a system 200 configured to perform the method 100 in accordance with some embodiments. As shown in FIG. 2, the system 200 includes a routing computation node 20, a routing dissemination node 30, a set of acceleration nodes 10 (e.g., acceleration nodes S1, S2, S3 and S4), and a set of service nodes 40 (e.g., service nodes D1, D2 and D3).

As shown in FIG. 2, the routing computation node 20 is operatively coupled to and communicates with the routing dissemination node 30. The set of acceleration nodes 10 are operatively coupled to and communicate with the routing computation node 20 and the routing dissemination node 30. Each service node 40 from the set of service nodes 40 is operatively coupled to and communicates with one or more acceleration nodes 10.

In some embodiments, although not shown in FIG. 2, the routing computation node 20 can be operatively coupled to and communicate with more than one routing dissemination nodes. In such embodiments, the routing computation node 20 can function as a centralized computing device (e.g., a computing server, a data processing server) to generate and provide routing information and/or data to the multiple routing dissemination nodes. In some embodiments, a system configured to generate and disseminate routing information in a network can include any number of routing computation nodes and/or any number of routing dissemination nodes. Each routing computation node included in such a system can be identical or similar to the routing computation node 20 described herein, and each routing dissemination node included in such a system can be identical or similar to the routing dissemination node 30 described herein.

In some embodiments, the system 200 can be implemented in a large-scale network, and devices of the system 200 can be deployed at various geographic areas across the large-scale network. Such a network can be any type of network configured to operatively couple one or more routing computation nodes (e.g., the routing computation node 20) and one or more routing dissemination nodes (e.g., the routing dissemination node 30) to one or more acceleration nodes (e.g., the acceleration nodes S1-S4) and one or more service nodes (e.g., the service nodes D1-D3), and enable communications among those nodes.

In some embodiments, the network in which the system 200 is implemented can include one or more networks such as, for example, a cellular network, a satellite network, a local area network (LAN), a wide area network (WAN), a wireless local area network (WLAN), the Internet, etc. Furthermore, the network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

The routing computation node 20 and the routing dissemination node 30 can be any type of device configured to compute and disseminate routing information to the acceleration nodes 10 and/or the service nodes 40. Specifically, the routing computation node 20 is configured to receive network quality information and compute to generate routing information based on the received network quality information. The routing dissemination node 30 is configured to send the generated routing information to the acceleration nodes 10 and/or the service nodes 40.

In some embodiments, the routing computation node 20 and the routing dissemination node 30 can be, for example, a background server, a back end server, a database server, a computing server (a cloud computing server or a standalone computing server), a workstation, a desktop computer, a data processing server, and/or the like. In some embodiments, the routing computation node 20 and the routing dissemination node 30 can be a server cluster or server center consisting of two or more servers (e.g., a data processing server and a computing server).

Each acceleration node 10 can be any type of device configured to operatively couple the service nodes 40 and other acceleration nodes such that the acceleration node 10 can forward service data transmitted between the service nodes 40 and other acceleration nodes. In some embodiments, an acceleration node 10 can be configured to monitor network quality by, for example, periodically measuring parameters indicating quality of communication links connecting the acceleration node 10 with other acceleration nodes and the service nodes 40. The acceleration node 10 can further send the measured parameter values to the routing computation node 20 such that the routing computation node 20 can compute based on the measured parameter values to generate routing information.

Each service node 40 can be any type of server device configured to provide one or more services and/or applications to users (not shown in FIG. 2) connected to the network. The services and/or applications provided by a service node 40 can be any type of network service or application such as, for example, an instant messaging app, a social networking website, an online gaming service, and/or the like. Each service node 40 can be configured to receive service data from and/or transmit service data to other service nodes via the acceleration nodes 10. Furthermore, each service node 40 can be configured to generate and/or process service data.

Although not shown in FIG. 2, the service nodes 40 can be accessed and/or operated by users, and can be operatively coupled to and communicate with various types of user terminal devices (e.g., a cellular phone, a smart phone, a mobile Internet device (MID), a personal digital assistant (PDA), a tablet computer, an e-book reader, a laptop computer, a handheld computer, a desktop computer, a wearable device, a MP3 (Moving Picture Experts Group Audio Layer III) player, a MP4 (Moving Picture Experts Group Audio Layer IV) player, etc.).

In some embodiments, each acceleration node 10 can be, for example, a routing device (e.g., a route server, a router), an acceleration server, a data transmission device, and/or the like. Each service node 40 can be, for example, a background server, a back end server, a database server, a computing server, a storage server, a workstation, a desktop computer, a data processing server, an application server, and/or the like. In some embodiments, a service node 40 can be a server cluster or server center consisting of two or more servers (e.g., a data processing server and a database server).

Figure 3:
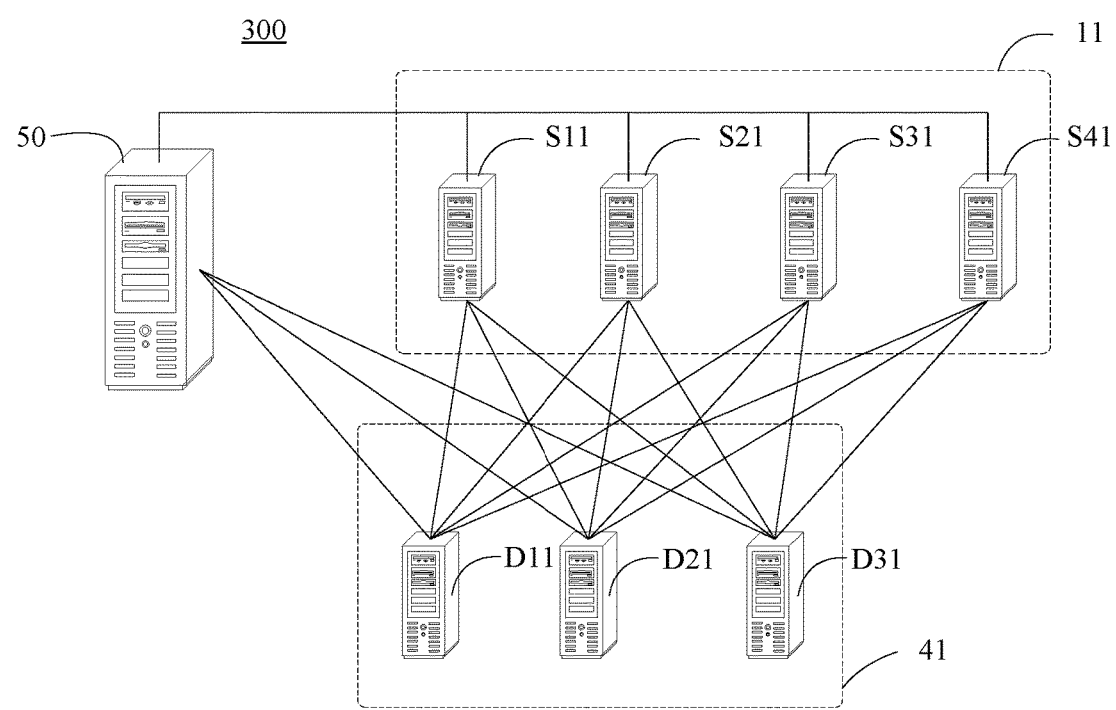
FIG. 3 is a schematic diagram illustrating another system configured to disseminate routing information in accordance with some embodiments.

FIG. 3 is a schematic diagram illustrating a system 300 configured to perform the method 100 in accordance with some other embodiments. As shown in FIG. 3, the system 300 includes an apparatus 50, a set of acceleration nodes 11 (e.g., acceleration nodes S11, S21, S31 and S41), and a set of service nodes 41 (e.g., service nodes D11, D21 and D31). The acceleration nodes 11 are structurally and functionally similar to the acceleration nodes 10 shown and described above with respect to FIG. 2. The service nodes 41 are structurally and functionally similar to the service nodes 41 shown and described above with respect to FIG. 2. Particularly, the set of acceleration nodes 11 are operatively coupled to and communicate with the apparatus 50, and each service node 41 is operatively coupled to and communicates with one or more acceleration nodes 11.

The apparatus 50 is functionally similar to the combination of the routing computation node 20 and the routing dissemination node 30 shown and described above with respect to FIG. 2. In other words, the apparatus 50 is configured to perform the functions of the routing computation node 20 and the routing dissemination node 30 described above with respect to FIG. 2. In some embodiments, the apparatus 50 can be a single physical device (e.g., a server device) comprising multiple modules. For example, the apparatus 50 can include a routing computation module configured to compute and generate routing information, and a routing dissemination module configured to disseminate the generated routing information to the acceleration nodes 11. In some other embodiments, the apparatus 50 can be a server cluster or server center consisting of two or more physical devices (e.g., a data processing server and a computing server).

Returning to FIG. 1, the system or apparatus performing the method 100 can be, for example, a system similar to the system 200 (including the routing computation node 20 and the routing dissemination node 30) shown and described above with respect to FIG. 2, or an apparatus similar to the apparatus 50 shown and described above with respect to FIG. 3. Although described in FIG. 1 as a system (e.g., the system 200) including a routing computation node and a routing dissemination node performing the method 100, operations of the method 100 can also be performed by an apparatus similar to the apparatus 50 (e.g., a single physical device including a routing computation module and a routing dissemination module) in the same or similar manner as described herein.

In some embodiments, the method 100 is implemented using instructions or code of one or more applications that are stored in one or more non-transitory computer readable storage mediums of the system (e.g., the system 200 in FIG. 2) and executed by the one or more processors of the system. In such embodiments, the applications are associated with generating and disseminating routing information to a set of acceleration nodes (e.g., the set of acceleration nodes 10 in FIG. 2), and are stored in and/or executed at routing computation node and the routing dissemination node of the system. As a result of such applications being executed, the method 100 is performed to generate and disseminate routing information to the set of acceleration nodes. As shown in FIG. 1, the method 100 includes the following steps.

At S102, the routing computation node receives, from the set of acceleration nodes, values of a group of network quality parameters. The group of network quality parameters indicates a level of network quality among the set of acceleration nodes and between the set of acceleration nodes and the set of service nodes. In some embodiments, the group of network quality parameters can include any type of parameter that reflects network quality of performance of a communication link connecting two nodes (e.g., two acceleration nodes, an acceleration node and a service node). For example, the group of network quality parameters can include, for example, a delay parameter or a packet loss rate parameter.

In some embodiments, the routing computation node is configured to generate and send probing instructions to the set of acceleration nodes. The routing computation node can send probing instructions to the set of acceleration nodes in any suitable manner. For example, the routing computation node can periodically (e.g., every 2 minutes, every 30 minutes, every hour, etc.) send probing instructions to the set of acceleration nodes. For another example, the routing computation node can be triggered to send probing instructions to the set of acceleration nodes in response to detecting or receiving an external cause (e.g., a command, an instruction, an event).

In some embodiments, the routing computation node can, for example, generate and send a group of probing instructions, each of which being destined to one acceleration node from the set of acceleration nodes. In response to receiving such a probing instruction, an acceleration node can obtain values of the group of network quality parameters associated with communication links between that acceleration node and other acceleration nodes, as well as communication links between that acceleration node and the set of service nodes. The acceleration node then sends the obtained values of the group of network quality parameters to the routing computation node.

In some embodiments, an acceleration node can obtain network quality parameter values associated with communication links connecting that acceleration node with another acceleration node or service node that is one-hop away from that acceleration node. In other embodiments, an acceleration node can obtain network quality parameter values associated with communication links connecting other acceleration nodes and/or service nodes that are more than one-hop away from that acceleration node.

In some embodiments, the routing computation node can, for example, send one probing instruction to an acceleration node, which then sends ping commands to each remaining acceleration node and/or each service node from a set of service nodes (e.g., the set of service nodes 40 in FIG. 2) operatively coupled to the set of acceleration nodes. In such embodiments, each acceleration node is capable of sending such a ping command to and receiving such a ping command from another acceleration node, while each service node is capable of receiving ping commands from the acceleration nodes but not capable of sending any ping command to any acceleration node or service node.

In response to receiving such a ping command (from an acceleration node), an acceleration node or a service node can obtain values of the group of network quality parameters associated with communication links between that acceleration node or service node with other nodes (e.g., acceleration nodes and/or service nodes). The acceleration node or service node then sends the obtained values of the group of network quality parameters to the acceleration node that sent the ping command.

In some embodiments, a first acceleration node receiving network quality parameter values from another node (e.g., another acceleration node or a service node) in response to a ping command sent from the first acceleration node to the other node can then forward the received network quality parameter values to, for example, a second acceleration node from which the first acceleration node received a ping command, or the routing computation node from which the first acceleration node received a probing instruction. In such a method for forwarding data, network quality parameter values obtained at each acceleration node and each service node can eventually be transmitted to the routing computation node that initiates the probing instruction.

In some embodiments, a node (e.g., an acceleration node or a service node) is configured to monitor network quality of the communication links that connect that node with other nodes (e.g., other acceleration nodes and/or service nodes). For example, the node can periodically (e.g., every 2 minutes, every 30 minutes, every hour, etc.) sample parameter measurements that indicate the network quality of those communication links. Such a network quality parameter can be measured, for example, based on statistic data associated with packets (e.g., data packets, control packets) transmitted over a communication link during a period of time. In such embodiments, the node periodically updates the measurements of the network quality parameters and stores the measured values of the network quality parameters. Thus, when prompted by the routing computation node or another node (e.g., receiving a probing instruction from or a ping command), the node can provide the newest measurements of network quality parameters that reflect the most up-to-date status of the communication links.

After receiving the values of the group of network quality parameters from the acceleration nodes and/or the service nodes, the routing computation node generates, based on the values of the group of network quality parameters, routing information associated with routing paths from the set of acceleration nodes to the set of service nodes via the set of acceleration nodes. In some embodiments, the routing computation node generates routing information associated with routing paths from each acceleration node from the set of acceleration nodes to each service node from the set of service nodes. In such embodiments, the number of routing paths, whose routing information is generated at the routing computation node, is the multiply of the total number of acceleration nodes from the set of acceleration nodes and the total number of service nodes from the set of service nodes. Alternatively, in some other embodiments, the routing computation node generates routing information associated with routing paths from each of a portion or all acceleration nodes from the set of acceleration nodes to each of a portion or all service nodes from the set of service nodes.

In operation, for example, the routing computation node designates an acceleration node from the set of acceleration nodes as a source node, and designates a service node from the set of service nodes as a first destination node. The routing computation node then determines, based on the values of the group of network quality parameters and from the set of acceleration nodes, a series of intermediate hop nodes connecting the source node and the first destination node. The routing computation node further generates routing information associated with a routing path from the source node to the first destination node via the series of intermediate hop nodes.

Similarly, the routing computation node designates another service node from the set of service nodes as a second destination node, and repeats the above process to generate routing information associated with another routing path from the source node to the second destination node via a different series of intermediate hop nodes. As such, the routing computation node can generate routing information associated with routing paths from each of multiple or all acceleration nodes from the set of acceleration nodes to each of multiple or all service nodes from the set of service nodes.

Figure 4:
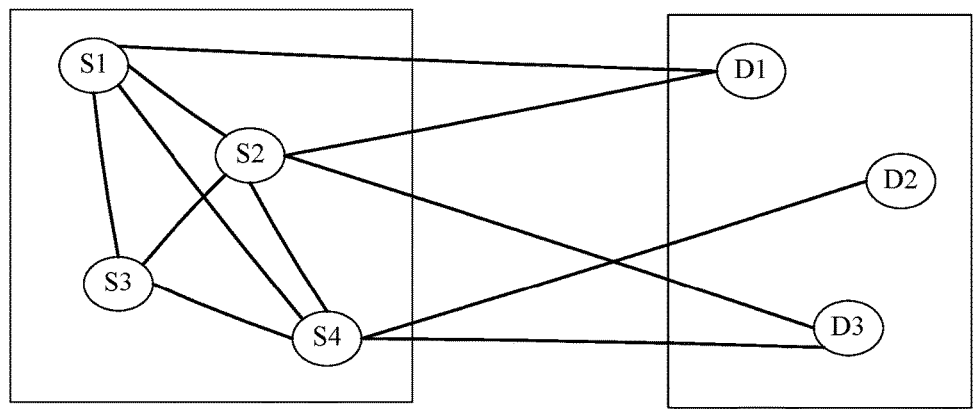
FIG. 4 is a topologic diagram illustrating the set of service nodes and the set of acceleration nodes in FIG. 2.

As an example, FIG. 4 shows a topologic diagram illustrating the set of acceleration devices 10 and the set of server devices 40 in FIG. 2. Table 1 illustrates routing information generated for routing paths connecting each acceleration node 10 and each service node 40. As discussed above, routing information for a total of 12 (calculated as 4 (number of acceleration nodes)×3 (number of service nodes)) routing paths is generated and stored in Table 1. In some embodiments, routing information associated with routing paths can be generated and/or stored at a node (e.g., a routing computation node) in any other suitable method or format (e.g., in any other suitable data structure).

TABLE 1

| Source Node | Destination Node | Routing Path |
|---|---|---|
| S1 | D1 | S1-S2-S3-D1 |
| S1 | D2 | S1-S3-S4-D2 |
| S1 | D3 | S1-S2-S4-D3 |
| S2 | D1 | S2-S1-D1 |
| ... | ... | ... |
| S4 | D3 | S4-D3 |

Although shown in FIGS. 2 and 3 as single physical devices, in other embodiments, a source node, a destination node or an intermediate hop node can be a cluster of multiple devices. In such embodiments, a source node, a destination node or an intermediate hop node can be identified by an identifier indicating a single device or multiple devices. For example, a node (e.g., a source node, a destination node or an intermediate hop node) can be identified by a single IP address (e.g., 192.169.1.0) indicating a single device or a block IP address (e.g., 192.168.1.x) indicating multiple devices (e.g., devices with an IP address between 192.168.1.0 and 192.168.1.255). For another example, a node (e.g., a source node, a destination node or an intermediate hop node) can be identified by a string that can be mapped to a single network address or a block of network addresses at an address server (e.g., a DNS (domain name system) server).

In some embodiments, a group of acceleration nodes are directly coupled to the set of service nodes and/or user terminal devices, while the remaining acceleration nodes are coupled to other acceleration nodes without being directly coupled to any service node or user terminal device. That is, each acceleration node from the group of nodes is one-hop away from a service node or a user terminal device. Thus, each acceleration node from the group of acceleration nodes can be designated as a source node, while each remaining acceleration node excluded from the group of acceleration nodes is not necessarily designated as a source node.

In some embodiments, the routing computation node can obtain information of rated load at the set of acceleration nodes and bandwidth of the set of acceleration nodes. Similarly, the routing computation node can further obtain other information of the acceleration nodes such as, for example, information of current load and/or available bandwidth of each acceleration node from the set of acceleration nodes. In such embodiments, the routing computation node can determine intermediate hop nodes and generate routing information for a routing path based on the information of rated load and bandwidth, and/or other information of the acceleration nodes.

In some embodiments, values for configuration parameters of an acceleration node such as, for example, the rated load and/or bandwidth of the acceleration node are predefined and included in a configuration file and/or set in a configuration server prior to that acceleration node is configured and activated. In such embodiments, the routing computation node can obtain information of the rated load and/or bandwidth by, for example, reading the configuration file and/or accessing the configuration server. Furthermore, the routing computation node can obtain values of network quality parameters that reflect a real-time, dynamic status of communication links (e.g., delay parameter, packet loss rate parameter, etc.) by, for example, detecting and monitoring data transmissions over the communication links in real time. As a result, the routing computation node can determine the series of intermediate hop nodes from the set of acceleration nodes based on the values of configuration parameters as well as values of network quality parameters.

In some embodiments, the routing computation node can determine the intermediate hop nodes from the set of acceleration nodes in any suitable method such as, for example, comparing network quality parameter values with predefined thresholds, assigning various priority scores to different communication links based on the network quality parameter values associated with the communication links, and/or the like.

For example, if the routing computation node determines that the packet loss rate of the communication link between acceleration node A (as a source node or an intermediate hop node) and acceleration node B (as a potential intermediate hop node for acceleration node A to a given destination node) is greater than a predefined threshold on packet loss rate, and/or the delay of that communication link is greater than a predefined delay threshold, then acceleration node B is eliminated from the list of potential intermediate hop nodes for acceleration node A to the given destination node. In other words, acceleration node B will not be selected as an intermediate hop node for the routing path connecting acceleration node A to the destination node if the network quality and performance of the communication link connecting acceleration node A and acceleration node B are below a certain threshold (e.g., represented by the predefined threshold on packet loss rate and the predefined delay threshold).

In some embodiments, if the routing computation node determines that a communication link between two nodes (e.g., two acceleration nodes) has a packet loss rate less than the predefined threshold on packet loss rate, and a delay less than the predefined delay threshold, then the communication link is qualified as a potential communication link for consideration in determining the intermediate hop nodes. Furthermore, various priority scores can be assigned to each communication link based on the values of network quality parameters (e.g., packet loss rate, delay) associated with that communication link. For example, the better the performance of a communication link is (e.g., the lower the packet loss rate and/or the shorter the delay), the higher the priority score assigned to that communication link is. The routing computation node can then select a communication link that has the highest priority score among the potential communication links. Additionally, in some embodiments, priority scores can be also calculated based on values of configuration parameters associated with an acceleration node in a similar method (e.g., a higher priority for a higher rated load and/or a larger bandwidth).

For example, acceleration node A (as a source node or an intermediate hop node) can send service data to node C (as a destination node or an intermediate hop node) directly or via acceleration node B (as an intermediate hop node). The routing computation node calculates, based on the corresponding values of network quality parameters, priority scores for the communication link from acceleration node A to acceleration node B, the communication link from acceleration node A to node C, and the communication link from acceleration node B to node C. The routing computation node then compares the priority score for the communication link from acceleration node A to node C and the sum of the priority scores for the communication link from acceleration node A to acceleration node B and the communication link from acceleration node B to node C. Accordingly, the routing computation node selects the communication link(s) that has the higher priority score to be included in the routing path connecting acceleration node A to node C.

Returning to FIG. 1, at S104, the routing dissemination node retrieves the generated routing information from the routing computation node. The routing dissemination node then disseminates the retrieved routing information to the set of acceleration nodes. In some embodiments, the routing dissemination node can retrieve routing information from the routing computation node in various methods. For example, the routing dissemination node can periodically retrieve routing information from the routing computation node, or retrieve routing information from the routing computation node in response to instant triggering events (e.g., failure of an acceleration node).

Based on the retrieved routing information, the routing dissemination node determines a routing path including a source node, a destination node and a series of intermediate hop nodes for each pair of source node and destination node. Subsequently, the routing dissemination node determines a next-hop node for each node included in the routing path except for the destination node. The routing dissemination node then sends information (e.g., node identifiers) of the source node, the destination node and the appropriate next-hop node to each node included in the routing path except for the destination node. As a result, each node included in the routing path except for the destination node is updated with routing information, particularly, the next-hop node for service data originated at the source node and destined to the destination node.

Figure 5:
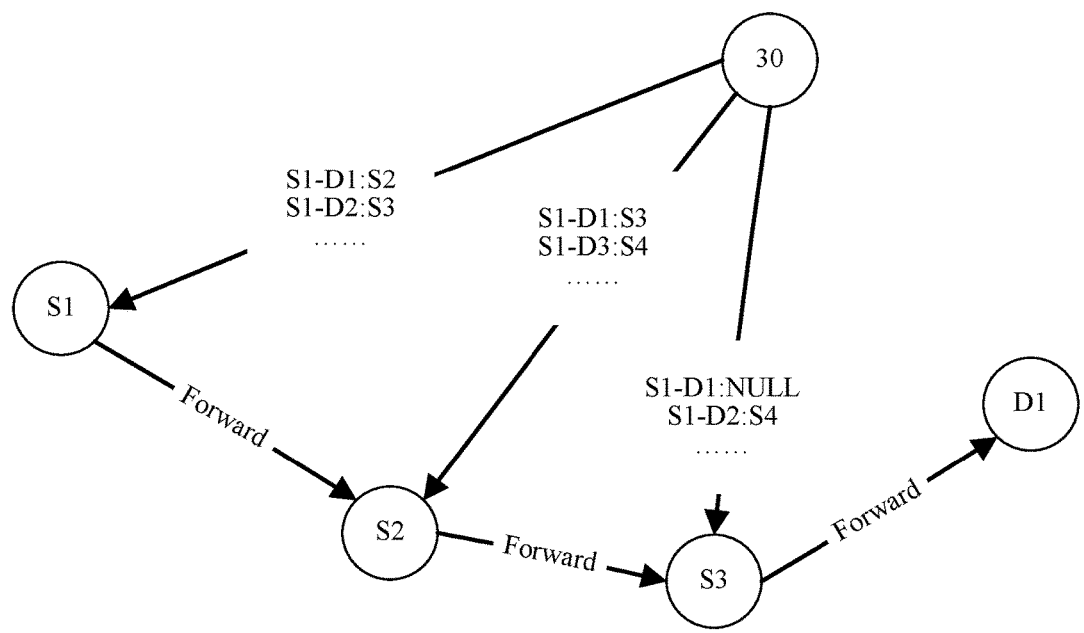
FIG. 5 is a schematic diagram illustrating dissemination of routing information among the set of acceleration nodes in FIG. 2.

As an example, FIG. 5 is a schematic diagram illustrating dissemination of routing information among the set of acceleration nodes 10 in FIG. 2. As shown in Table 1 above, in the routing path S1-S2-S3-D1, S1 is the source node, D1 is the destination node, and S2, S3 are the intermediate hop nodes. The routing dissemination node 30 disseminates corresponding routing information of this routing path to the nodes included in the routing path except for the destination node D1. As shown in FIG. 5, the routing dissemination node 30 sends information of S1-D1:S2 to the source node S1, which includes information of the source node S1, the destination node D1, and the next-hop node S2 for the source node S1. Similarly, the routing dissemination node 30 sends information of S1-D1:S3 to the intermediate hop node S2, which includes information of the source node S1, the destination node D1, and the next-hop node S3 for the intermediate hop node S2; the routing dissemination node 30 sends information of S1-D1:NULL to the intermediate hop node S3, which includes information of the source node S1, the destination node D1, and the next-hop node NULL for the intermediate hop node S3, where NULL indicates that the next-hop node for the intermediate hop node S3 is the destination node D1. Alternatively, the next-hop node for the intermediate hop node S3 can be identified to be D1.

Although not shown in FIG. 5, in some other embodiments, the routing dissemination node can send routing information in other format to the corresponding intermediate hop nodes of a routing path. For example, the routing dissemination node can send information of a full routing path to each node of the routing path (except for the destination node). In the example of FIGS. 2, 5 and Table 1, for service data having a source node S1 and a destination node D1, instead of sending information of a next-hop node to each node except for the destination node D1, the routing dissemination node 30 can send information of the full routing path "S1-S2-S3-D1" to each node S1, S2, and S3.

In some embodiments, as discussed above, a source node, a destination node or an intermediate hop node can be associated with multiple devices (e.g., identified by an identifier indicating multiple devices or identified by multiple identifiers). In such embodiments, the routing dissemination node can send the routing information to each device from the multiple devices corresponding to the single node. As a result, in case of one or several devices from the multiple devices fail or malfunction, the remaining device(s) from the multiple devices can function to forward service data accordingly. For example, an intermediate hop node can include multiple servers at a data center or server room, which correspond to a block of IP addresses (e.g., 192.168.3.0 to 192.168.3.255). The routing dissemination node sends the routing information to each server with an IP address 192.168.3.x, such that each server can function, based on the routing information, as a data forwarder independently from other servers. Thus, robustness and performance of the multiple servers as an intermediate hop node in the routing path are improved.

Returning to FIG. 1, at S106, the set of acceleration nodes receive service data destined to the set of service nodes. The set of acceleration nodes then forward the service data to the destined service node from the set of service nodes based on the routing information received from the routing dissemination node.

In some embodiments, service data refers to any data that is generated at, transmitted to, and/or processed at a service node (e.g., the service nodes 40 in FIG. 2). In some embodiments, the service data can be generated at a service node or a user terminal device operatively coupled to a service node or an acceleration node, and then sent from the service node or the user terminal device to an acceleration node. The acceleration node initially receiving service data from a service node or a user terminal device is a source node, which then forwards the service data to a destined service node (as a destination node) via none, one or more other acceleration nodes (as intermediate hop node(s)).

For example, with respect to an online gaming application or a social networking application, users manage servers located at different geographic areas to exchange service data. An online gaming server or social networking server located at a geographic area, as a service node, sends service data to an acceleration node, which then forwards the service data to another online gaming server or social networking server located at another geographic area, as a service node, in a hop-by-hop manner via a series of other acceleration nodes (as intermediate hop nodes).

For another example, with respect to a network drive application, users use terminal devices (e.g., smart phones, tablet computers, laptop computers, etc.) to upload data to be stored in a cloud storage provided by the network drive application. Specifically, a user operates a terminal device to send data to an acceleration node, which then forwards the data to a network storage server, as a service node, in a hop-by-hop manner via a series of other acceleration nodes (as intermediate hop nodes). The data is then stored at the network storage server.

In some embodiments, after an acceleration node (e.g., as a node initially receiving service data from a service node or user terminal device, or an intermediate hop node receiving service data from another acceleration node) receives service data (e.g., from a service node, a user terminal device, or a previous-hop acceleration node), the acceleration node can retrieve a source address and a destination address from the service data (e.g., from a header of a data packet). The acceleration node can then determine a source node and a destination node based on the retrieved source address and destination address. For example, the acceleration node can query an address server (e.g., a DNS server) to determine the source node and the destination node. Subsequently, the acceleration node can determine, based on the information retrieved from the service data, corresponding routing information from the routing information received from the routing dissemination node. The acceleration node can then forward the service data to its next-hop node based on the retrieved routing information accordingly.

In some embodiments, as described above with respect to FIGS. 2, 5 and Table 1, the routing information of a routing path sent from a routing dissemination node to an acceleration node includes information of a source node, a destination node and a next-hop node in the routing path for that acceleration node. In such embodiments, the acceleration node can send the received service data to its next-hop node accordingly. In some other embodiments, as described above, the routing information of a routing path sent from a routing dissemination node to an acceleration node includes full information of the routing path including each node (e.g., source node, intermediate hop node, destination node) included in the routing path. In such embodiments, the acceleration node can first determine its next-hop node from the routing information, and then send the received service data to its next-hop node accordingly. Additionally, as described above, if an acceleration node determines that its next-hop node is identified as NULL or not identified, the acceleration node can send the received service data to the destination node directly.

In some embodiments, as described above, an acceleration node can have multiple devices as its next-hop node in a routing path. In such embodiments, the acceleration node retrieves one or more identifiers associated with its next-hop node from the routing information, and then determines multiple network addresses (e.g., IP address) of its next-hop node corresponding to the one or more identifiers. Subsequently, the acceleration node selects one network address from the multiple network addresses that is reachable from the acceleration node, and then sends the service data to the device associated with the selected network address. The acceleration node can select the one network address from the multiple network addresses using any suitable method (e.g., based on priority scores of communication link, based on historical routing information, etc.). Alternatively, in some embodiments, the acceleration node can send, in a multicast manner, a copy of the service data to each device associated with a network address from the multiple network addresses, or each device associated with a reachable network address from the multiple network addresses.

In some embodiments, if an acceleration node is not able to determine routing information for received data including information of the next-hop node for the received data, the acceleration node is configured to discard the received data or determine the next-hop node for the received data based on, for example, a transport layer protocol or a network layer protocol. In such embodiments, the method of generating and/or disseminating routing information as described herein (e.g., the method 100 in FIG. 1) is based on an application layer protocol, which is used to accelerate, at the application layer, the routing process for data transmission.

Thus, if the acceleration node receives data that is not originated at a source node and/or destined to a service node, then the received data can be, for example, control data associated with a communication protocol (e.g., a transport layer protocol or a network layer protocol) transmitted between two acceleration nodes or between an acceleration node and a service node, service data destined to a service node whose routing information is not available at the routing computation node yet, or other types of data transmitted between other network devices. The acceleration node can discard such data, or obtain a network address of a next-hop node for such data according to a transport layer protocol or a network layer protocol, and then forward the data accordingly.

Additionally, in some embodiments, after an acceleration node discards service data or determines a next-hop node for the service data based on a transport layer protocol or a network layer protocol, the acceleration node can send, to the routing computation node via the routing dissemination node, information of the destined service node that is retrieved from the service data. In other words, the acceleration node can report, to the routing computation node, the destined service node whose routing information is not yet available at the routing computation node. As a result, the routing computation node can designate that service node as a destination node, perform the operations of the step S102 described above to generate routing information for the service node, and then disseminate the generated routing information to associated acceleration nodes via the routing dissemination node.

In the example of FIG. 2, the system 200 includes three service nodes D1, D2 and D3. When a new service node D4 (not shown in FIG. 2) is added to the system 200 (e.g., due to expanded service coverage), the service nodes D1, D2 and D3 attempt to send service data to the service node D4 via the acceleration nodes 10. After receiving such service data, an acceleration node 10 (e.g., the acceleration node S1, S2, S3 or S4) determines that routing information associated with routing service data to the service node D4 is not available (because such routing information is not generated at the routing computation node 20 or disseminated by the routing dissemination node 30 yet). Accordingly, the acceleration node 10 discards the service data or forwards the service data towards the service node D4 based on a transport layer protocol or a network layer protocol. The acceleration node 10 also reports the service node D4 to the routing computation node 20. Specifically, the acceleration node 10 can send an identifier of the service node D4 to the routing computation node 20 via the routing dissemination node 30.

After receiving information of the service node D4 from the acceleration node 10, the routing computation node sends probing instructions to each acceleration node 10, causing each acceleration node 10 to send a ping command to the service node D4. The routing computation node then obtains values of network quality parameters associated with communication links to the service node D4. The routing computation node further generates routing information associated with routing paths connecting the acceleration nodes 10 (as source nodes) to the service node D4 (as a destination node), and disseminates the generated routing information to the acceleration nodes 10 via the routing dissemination node 30 accordingly (e.g., based on a periodic dissemination schedule, disseminate immediately, etc.).

In some embodiments, in forwarding service data to an intermediate hop node (e.g., an acceleration node), an acceleration node can be configured to include control information in or append control information to the service data. That is, the acceleration node can generate and add control information to the service data prior to sending the processed service data to the next-hop acceleration node (i.e., an intermediate hop node). Such control information can be used to manage data transmission at the acceleration nodes and/or for statistical purposes. The control information can include, for example, information used in logging data transmissions and/or calculating data volume, information associated with implementing any application protocol, and/or the like.

In some embodiments, in addition to adding new control information to received service data, an acceleration node can be configured to process, modify and/or update existing control information that is included in the service data when the service data is received at that acceleration node and before the acceleration node forwards the service data to the next-hop node. Furthermore, the last intermediate hop node (i.e., an acceleration node) can remove the control information included in the service data before forwarding the service data to the destination (i.e., the destined service node). As a result, the destined service node receives the service data without receiving any control information that is generated and processed at the acceleration nodes along the routing path.

In some embodiments, the routing computation node can be configured to detect abnormal behavior of acceleration nodes, and recalculate and update routing information in response to a detection of abnormal behavior of one or more acceleration nods. In such embodiments, each acceleration node from the set of acceleration nodes sends (e.g., continuously, periodically, randomly, arbitrarily, etc.) probing packets (e.g., heartbeat packets) to the routing dissemination node. The routing dissemination node detects, based on the received probing packets, abnormal behavior of the acceleration nodes. For example, the routing dissemination node detects an abnormal acceleration node based on a detection of a delay in receiving probing packets from that acceleration node. The routing dissemination node then reports the detected abnormal acceleration node(s) to the routing computation node (e.g., send the identifier of each detected abnormal acceleration node to the routing computation node).

Subsequently, the routing computation node determines the routing information involving the abnormal acceleration node(s) detected by the routing dissemination node. The routing computation node then recalculates and updates the routing information based on up-to-date network quality parameter values. Particularly, in some embodiments, the routing computation node determines the source node and destination node of each routing path that involves the abnormal acceleration node(s). The routing computation node determines, based on up-to-date network quality parameter values and from the set of acceleration nodes, a series of intermediate hop nodes connecting the source node and the destination node. The routing computation node then generates routing information associated with a new routing path from the source node to the destination node via the newly-determined series of intermediate hop nodes. As such, since the up-to-date network quality parameter values reflect the abnormal behavior of the abnormal acceleration node(s), none of the acceleration node(s) will be included in the newly-generated routing path.

In such a method, each acceleration node from the set of acceleration nodes notifies its connecting status to the routing dissemination node by sending probing packets to the routing dissemination node. The routing dissemination node detects an abnormal connecting status of an acceleration node when a probing packet from that acceleration node is not received on time (e.g., lost or delayed) at the routing dissemination node. As a result, the routing dissemination node reports the abnormal acceleration node to the routing computation node, which then updates routing information accordingly.

In the example of Table 1, if the acceleration node S3 is detected to have an abnormal connecting status, routing paths involving the acceleration node S3 (including the routing path S1-S2-S3-D1 for connecting the acceleration node S1 and the service node D1, and the routing path S1-S3-S4-D2 for connecting the acceleration node S1 and the service node D2) will need to be recalculated. Accordingly, routing information associated with sending service data from the acceleration node S1 to the service nodes D1, D2 will be recalculated based on up-to-date network quality parameter values.

In some embodiments, the routing dissemination node can detect an abnormal operational status of one or more acceleration nodes based on the probing packets received from the acceleration nodes. Specifically, each acceleration node can include in its probing packets data reflecting its operational status such as, for example, information of a current load, available bandwidth, and/or other information. The routing dissemination node can then detect an abnormal operational status of an acceleration node based on, for example, a determination that the current load of that acceleration node is greater than a load threshold (e.g., determined based on a rated load of that acceleration node) or the available bandwidth of that acceleration node is less than a bandwidth threshold (e.g., determined based on a rated bandwidth of that acceleration node). That is, the routing dissemination node can determine that the acceleration node is overloaded. Subsequently, similarly to the method described above, the routing dissemination node can then report the acceleration node(s) with an abnormal operational status to the routing computation node, which can then regenerate routing information to balance the load across the set of acceleration nodes.

As described above, FIG. 2 is a schematic diagram illustrating the system 200 configured to perform the method 100 in accordance with some embodiments. The routing computation node 20 is configured to receive, from the set of acceleration nodes 10, values of network quality parameters indicating a level of network quality among the set of acceleration nodes 10 and between the set of acceleration nodes 10 and the set of service nodes 40. The routing computation node 20 is also configured to determine, based on the values of the network quality parameters and from the set of acceleration nodes 10, intermediate hop nodes connecting the acceleration nodes 10 (as source nodes) and the service nodes 40 (as destination nodes). The routing computation node 20 is further configured to generate routing information associated with the routing paths from the acceleration nodes 10 (as source nodes) to the service nodes

40 (as destination nodes) via the corresponding intermediate hop nodes. The routing dissemination node 30 is configured to retrieve generated routing information from the routing computation node 20, and disseminate the retrieved routing information to the acceleration nodes 10 accordingly.

Each acceleration node 10 from the set of acceleration nodes 10 is configured to receive service data from a service node 40 or a user terminal device (not shown in FIG. 2) operatively coupled to that acceleration node 10. The acceleration node 10 is configured to retrieve information of a source node (e.g., an acceleration node 10) and a destination node (e.g., a service node 40) from the received service data. The acceleration node 10 is configured to retrieve, from the routing data received from the routing dissemination node 30, routing information associated with routing service data from the source node to the destination node. The acceleration node 10 is configured to forward the service data to its next-hop node (e.g., another acceleration node 10) based on the retrieved routing information. Thus, the service data is forwarded hop-by-hop via the intermediate hop nodes (i.e., the acceleration nodes 10) to the destined service node 40.

In some embodiments, the routing computation node 20 is also configured to designate an acceleration node 10 as a source node, and designate a service node 40 as a destination node. In some embodiments, the routing computation node 20 is configured to traverse the set of acceleration nodes 10 to designate each acceleration node 10 as a source node 10 one at a time. Similarly, for each acceleration node 10 designated as the source node, the routing computation node 20 is configured to traverse the set of service nodes 40 to designate each service node 40 as the destination node for that acceleration node 10. Thus, the routing computation node 20 calculates routing information for each pair of an acceleration node 10 and a service node 40.

In some embodiments, the routing dissemination node 30 is also configured to determine, from the routing information retrieved from the routing computation node 20, identifiers of the source node, the destination node, and each intermediate hop node for a routing path. The routing dissemination node 30 is configured to determine, based on the retrieved routing information, a next-hop node for each node included in the routing path except for the destination node. The routing dissemination node 30 is configured to send, to a node included in the routing path except for the destination node, information (e.g., identifiers) of the source node, the destination node and the next-hop node for that node. Thus, each node from the routing path except for the destination node can forward service data associated with the source node and the destination node to the appropriate next-hop node.

In some embodiments, the routing dissemination node 30 is further configured to obtain network addresses corresponding to the identifiers of a source node, destination node, and/or intermediate hop nodes of a routing path. In such embodiments, the routing dissemination node 30 is configured to send, to one or more network addresses corresponding to a node included in the routing path except for the destination node, information (e.g., identifiers) of the source node, the destination node and the next-hop node for that node. Alternatively, in some embodiments, the routing dissemination node 30 is configured to send, to one or more network addresses corresponding to a node included in the routing path except for the destination node, information (e.g., identifiers) of each node included in the routing path.

In some embodiments, an acceleration node 10 is configured to determine its next-hop node for a routing path based on routing information of that routing path received from the routing dissemination node 30. The acceleration node 10 is configured to forward service data to its next-hop node. If the acceleration node 10 determines that its next-hop node is identified as NULL, the acceleration node 10 is configured to forward the service data directly to the destined service node 40.

In some embodiments, an acceleration node 10 is configured to obtain one or more identifiers, and/or one or more network addresses of its next-hop node. The acceleration node 10 is configured to select, from the one or more network addresses of its next-hop node, one or more network addresses that are reachable to the acceleration node 10. In some embodiments, if an acceleration node 10 is not able to determine its next-hop node for service data based on the routing information received from the routing dissemination node 30, the acceleration node 10 is configured to discard the service data or forward the service data towards the destination node based on a transport layer protocol or a network layer protocol.

In some embodiments, an acceleration node 10 is configured to report a service node 40, routing information of which is not provided to the acceleration node 10 from the routing dissemination node 30, to the routing computation node 20 via the routing dissemination node 30. Subsequently, the routing computation node 20 can designate that service node 40 as a destination node and obtain network quality parameter values associated with communication links connecting the acceleration nodes 10 to that service node 40. The routing computation node 20 can generate routing information associated with routing service data from the acceleration nodes 10 to that service node 40, and then disseminate the generated routing information to corresponding acceleration nodes 10 via the routing dissemination node 30.

In some embodiments, an acceleration node 10 is configured to include control information in, or attach control information to, service data before forwarding the service data to the next-hop node. The acceleration node 10 is configured to process, modify and/or update control information attached to or included in the service data before forwarding the processed service data to the next-hop node. Furthermore, the acceleration node 10 is configured to remove control information from service data before sending the service data directly to a service node 40 as a destination node.

In some embodiments, an acceleration node 10 is configured to upload probing packets to the routing dissemination node 30. The acceleration node 10 can upload the probing packets to the routing dissemination node 30 continuously, periodically, randomly, arbitrarily, or in any other suitable manner. In such embodiments, the routing dissemination node 30 is configured to determine, based on the received probing packets, lost probing packets, delayed probing packets, etc., a connecting status of the acceleration node 10. Furthermore, the routing dissemination node 30 is configured to determine, based on the received probing packets, an operational status of the acceleration node 10. Thus, the routing dissemination node 30 can detect an abnormal connecting status or an abnormal operational status of the acceleration node 10. Subsequently, the routing dissemination node 30 can report any abnormal acceleration node 10 to the routing computation node 20, which can determine the routing information involving the abnormal acceleration node 10, and then update the routing information using the up-to-date network quality parameter values accordingly.

As described above, FIG. 3 is a schematic diagram illustrating the system 300 configured to perform the method 100 in accordance with some other embodiments. Particularly, the apparatus 50, as a subsystem of the system 300, is configured to perform the combined functions of the routing computation node 20 and the routing dissemination node 30 as described above with respect to FIG. 2. In some embodiments, a system similar to the system 200 in FIG. 2 can include a routing computation node (e.g., the routing computation node 20) and multiple routing dissemination nodes (e.g., the routing dissemination node 30). In such embodiments, the multiple routing dissemination nodes included in the system can be used to implement different applications and/or adopt different protocols. Thus, each routing dissemination node can retrieve different routing information from the routing computation node and disseminate the retrieved routing information accordingly based on the different applications and/or protocols associated with that routing dissemination node. In other words, routing information associated with various applications and/or protocols can be disseminated via different routing dissemination nodes, which improves flexibility and robustness of the system.

Figure 6:
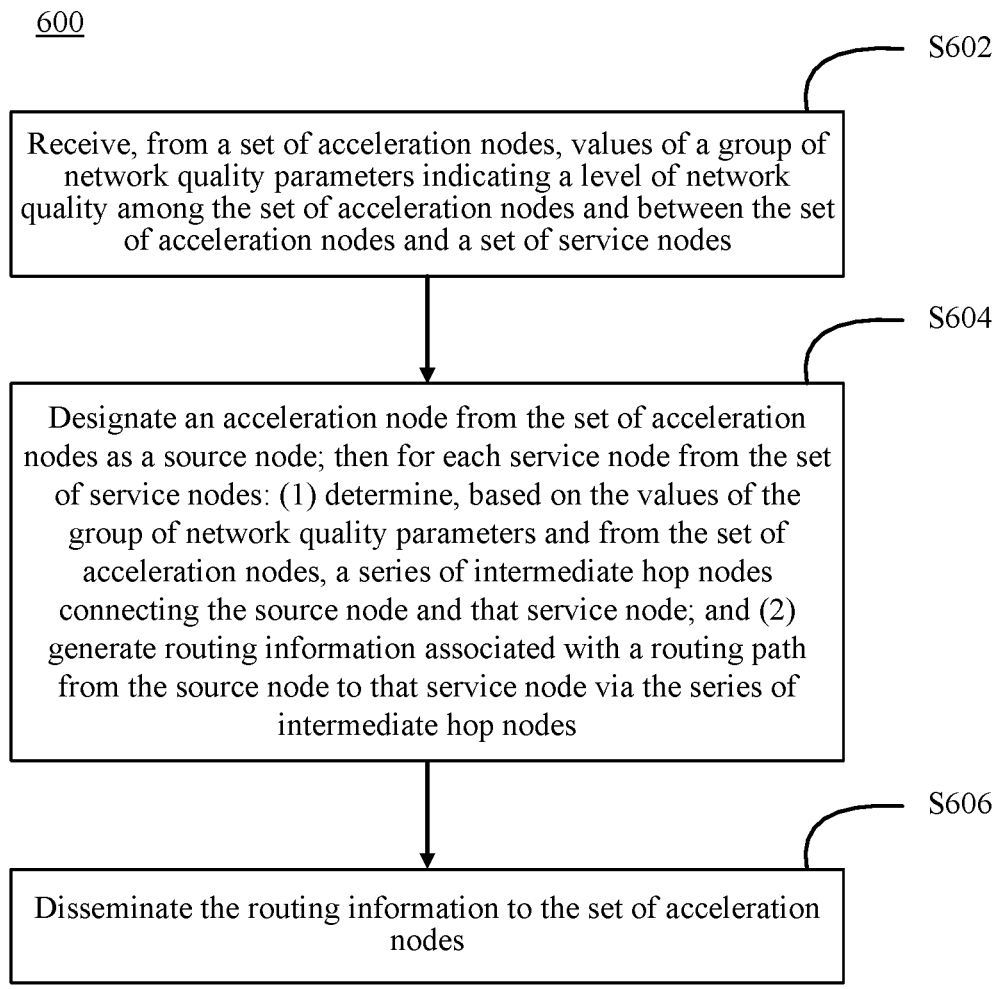
FIG. 6 is a flowchart illustrating another method for disseminating routing information in accordance with some embodiments.

FIG. 6 is a flowchart illustrating another method 600 for disseminating routing information in accordance with some embodiments. The system or apparatus performing the method 200 can be, for example, a subsystem including a routing computation node (e.g., the routing computation node 20 in FIG. 2) and one or more routing dissemination nodes (e.g., the routing dissemination node 30 in FIG. 2) similar to the system 200 shown and described above with respect to FIG. 2; or an apparatus similar to the apparatus 50 shown and described above with respect to FIG. 3. In other words, although described herein as an apparatus (e.g., the apparatus 50 in FIG. 3) performing the method 600, operations of the method 600 can also be performed by a system (e.g., the system 200 in FIG. 2) including a routing computation node and one or more routing dissemination nodes in the same or similar manner as described herein.

In some embodiments, the method 600 is implemented using instructions or code of one or more applications that are stored in one or more non-transitory computer readable storage mediums of the apparatus and executed by the one or more processors of the apparatus (e.g., the apparatus 50 in FIG. 3). In such embodiments, the application(s) are associated with generating and disseminating routing information to a set of acceleration nodes (e.g., the set of acceleration nodes 11 in FIG. 3), and are stored in and/or executed at the apparatus. As a result of such application(s) being executed, the method 600 is performed at the apparatus to generate and disseminate routing information to the set of acceleration nodes. As shown in FIG. 6, the method 600 includes the following steps.

At S602, the apparatus receives, from the set of acceleration nodes, values of a group of network quality parameters indicating a level of network quality among the set of acceleration nodes and between the set of acceleration nodes and a set of service nodes (e.g., the set of service nodes 41 in FIG. 3) operatively coupled to the acceleration nodes. In some embodiments, the group of network quality parameters includes at least one of a delay parameter and a packet loss rate parameter.

At S604, the apparatus designates an acceleration node from the set of acceleration nodes as a source node. Then for each service node from the set of service nodes, the apparatus determines, based on the values of the group of network quality parameters and from the set of acceleration nodes, a series of intermediate hop nodes connecting the source node and that service node. Then for each service node from the set of service nodes, the apparatus also generates routing information associated with a routing path from the source node to that service node via the series of intermediate hop nodes.

In some embodiments, the apparatus obtains information of a load (e.g., a rated load, a current load) and/or bandwidth (e.g., a rated bandwidth, an available bandwidth) of an acceleration node. The apparatus generates routing information based on the obtained information of the load and bandwidth, as well as other network quality parameter values (e.g., delay parameter, packet loss rate parameter, etc.) of the acceleration nodes.

In some embodiments, the apparatus receives probing packets from the set of acceleration nodes. The apparatus detects an abnormal connecting status or abnormal operational status of an acceleration node based on the received probing packets. The apparatus determines routing information involving the abnormal acceleration node, and then regenerate routing information based on up-to-date information and parameter values.

At S606, the apparatus disseminates the routing information to the set of acceleration nodes. In some embodiments, the apparatus retrieves, from generated routing information of a routing path, information (e.g., identifiers) of a source node, a destination node and each intermediate hop node of the routing path. The apparatus then determines a next-hop node for each node included in the routing path except for the destination node. The apparatus then sends information (e.g., identifiers) of the source node, the destination node and the next-hop node for a node included in the routing path to that node. Thus, each node included in the routing path except for the destination node is aware of its next-hop node in the routing path.

In some embodiments, an identifier of a node (e.g., a source node, an intermediate hop node, a destination node) corresponds to one or multiple network addresses. In such embodiments, the apparatus determines the one or multiple network addresses of each node included in a routing path except for the destination node. The apparatus then determines information (e.g., an identifier or one or more network addresses) of a next-hop node for each node included in the routing path except for the destination node. Subsequently, the apparatus sends the information (e.g., identifiers or the one or multiple network addresses) of the source node, the destination node and the next-hop node for a node included in the routing path to the one or multiple network addresses of that node. In some embodiments, the apparatus sends the routing information to multiple network addresses corresponding to a node (e.g., a source node or an intermediate hop node) in a multicast manner.

In some embodiments, the apparatus can traverse the set of acceleration nodes to designate each acceleration node from the set of acceleration nodes as the source node. In such a method the apparatus performs the method 600 (particularly the step S604) for each acceleration node from the set of acceleration nodes. Thus, the apparatus generates and disseminates routing information for each pair of an acceleration node from the set of acceleration nodes and a service node from the set of service nodes.

Figure 7:
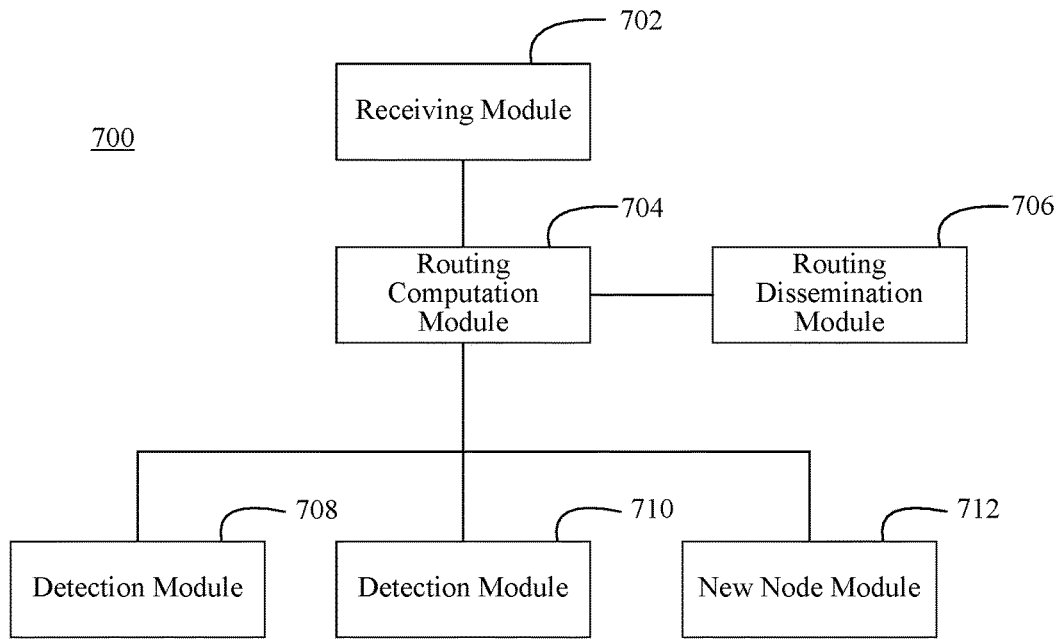
FIG. 7 is a block diagram of an apparatus configured to disseminate routing information in accordance with some embodiments.

FIG. 7 is a block diagram of an apparatus 700 configured to disseminate routing information in accordance with some embodiments. The apparatus 700 can be structurally and functionally similar to the apparatuses shown and described above with respect to FIGS. 3 and 6. Similar to the apparatus 50 in FIG. 3, apparatus 700 can be operatively coupled to and communicate with a set of acceleration nodes (e.g., the acceleration nodes 11 in FIG. 3) and a set of service nodes (e.g., the service nodes 41 in FIG. 3) to generate and disseminate routing information to the set of acceleration nodes.

As shown in FIG. 7, the apparatus 700 includes a receiving module 702, a routing computation module 704, a routing dissemination module 706, a detection module 708, a detection module 710, and a new node module 712. In some embodiments, each module included in the apparatus 700 can be a hardware-based module (e.g., a digital signal processor (DSP), a field programmable gate array (FPGA), an application-specific integrated circuit (ASIC), etc.), a software-based module (e.g., a module of computer code executed at a processor, a set of processor-readable instructions executed at a processor, etc.), or a combination of hardware and software modules. Instructions or code of each module can be stored in a memory of the apparatus 700 (not shown in FIG. 7) and executed at a processor (e.g., a CPU) of the apparatus 700 (not shown in FIG. 7).

The modules of the apparatus 700 (including the receiving module 702, the routing computation module 704, the routing dissemination module 706, the detection module 708, the detection module 710 and the new node module 712) can be configured to collectively perform the method 600 as shown and described above with respect to FIG. 6. In some embodiments, an apparatus configured to generate and/or disseminate routing information can include more or less modules as those shown in FIG. 7.

The receiving module 702 is configured to, among other functions, receive, from the set of acceleration nodes, network quality parameter values indicating a level of network quality among the set of acceleration nodes and between the set of acceleration nodes and the set of service nodes. The receiving module 702 is also configured to receive probing packets from the set of acceleration nodes.

The routing computation module 704 is configured to, among other functions, designate a source node (e.g., select an acceleration node from the set of acceleration nodes) and a destination node (e.g., select a service node from the set of service nodes); determine, based on the network quality parameter values and from the set of acceleration nodes, intermediate hop nodes connecting the source node and the destination node; and generate routing information associated with a routing path from the source node to the destination node via the intermediate hop nodes. In some embodiments, the routing computation node 704 is also configured to obtain other information (e.g., a rated load, a rated bandwidth, a current load, an available bandwidth, etc.) of the acceleration nodes, and generate the routing information based on the obtained other information of the acceleration nodes.

As shown in FIG. 7, the routing computation module 704 is operatively coupled to the detection module 708, the detection module 710 and the new node module 712. The detection module 708 is configured to detect an abnormal connecting status of an acceleration node based on, for example, delayed probing packets received at the receiving module 702 and/or missed probing packets. The detection module 708 is configured to report such an abnormal acceleration node to the routing computation node 704, which is configured to determine routing information involving the abnormal acceleration node and then regenerate routing information based on up-to-date information or network quality parameter values.

Similarly, the detection module 710 is configured to detect an abnormal operational status of an acceleration node based on, for example, a current load and/or available bandwidth of the acceleration node that is included in the probing packets received at the receiving module 702. The detection module 710 is configured to report such an abnormal acceleration node to the routing computation node 704, which is configured to determine routing information involving the abnormal acceleration node and then regenerate routing information based on up-to-date information or network quality parameter values.

The new node module 712 is configured to detect any newly-added service node, routing information associated with which is not yet generated at the routing computation module 704. The new node module 712 is configured to report such a newly-added service node to the routing computation module 704, which is configured to designate that service node as a destination node, prompt the acceleration nodes to provide network quality parameters associated with routing paths leading to the destination node, and then generate routing information associated with routing paths connecting the acceleration nodes to the destination node based on the network quality parameter values received from the acceleration nodes.

The routing dissemination module 706 is configured to, among other functions, disseminate routing information generated at the routing computation module 704 to the corresponding acceleration nodes from the set of acceleration nodes. In some embodiments, the routing dissemination module 706 is configured to send, to a node included in a routing path, information (e.g., identifiers and/or network addresses) of the source node of the routing path, the destination node of the routing path, and the next-hop node (can be identified as NULL) for that node in the routing path. In some other embodiments, the routing dissemination module 706 is configured to send, to a node included in a routing path, information (e.g., identifiers and/or network addresses) of the source node, the destination node and each intermediate hop node of the routing path. Additionally, in some embodiments, the routing dissemination node 706 is configured to send the generated routing information to one or more network addresses or network devices corresponding to a single node (e.g., a source node or an intermediate hop node) in a routing path.

Figure 8:
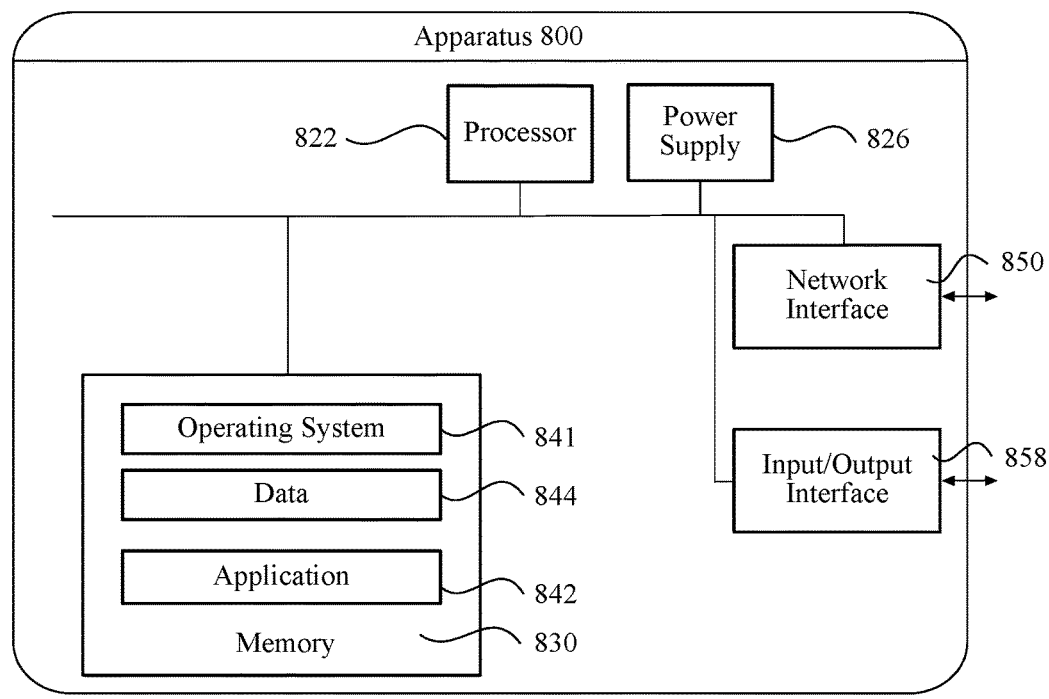
FIG. 8 is a block diagram illustrating components of an apparatus configured to disseminate routing information in accordance with some embodiments.

FIG. 8 is a block diagram illustrating components of an apparatus 800 configured to disseminate routing information in accordance with some embodiments. The apparatus 800 can be structurally and functionally similar to the apparatuses shown and described above with respect to FIGS. 3, 6 and 7. Similar to the apparatus 50 in FIG. 3, apparatus 800 can be operatively coupled to and communicate with a set of acceleration nodes (e.g., the acceleration nodes 11 in FIG. 3) and a set of service nodes (e.g., the service nodes 41 in FIG. 3) to generate and disseminate routing information to the set of acceleration nodes. As shown in FIG. 8, the apparatus 800 includes a processor 822, a memory 830 (including an operating system 841, data 844, and an application 842), a network interface 850, an input/output interface 858, and a power supply 826.

In some embodiments, an apparatus configured to generate and/or disseminate routing information can include more or less devices, components and/or modules than those shown in FIG. 8. One skilled in the art understands that the structure of the apparatus 800 shown in FIG. 8 does not constitute a limitation for the apparatus 800, and may include more or less components than those illustrated in FIG. 8. Furthermore, the components of the apparatus 800 (shown or not shown in FIG. 8) can be combined and/or arranged in different ways other than that shown in FIG. 8.

The processor 822 can be any processing device capable of performing a method for generating and/or disseminating routing information (e.g., the methods 100, 600 in FIGS. 1 and 6) described herein. Such a processor can be, for example, a CPU, a DSP, a FPGA, an ASIC, and/or the like. The processor 822 can be configured to control the operations of other components and/or modules of the apparatus 800. For example, the processor 822 can be configured to control operations of the network interface 850. For another example, the processor 822 can be configured to execute instructions or code stored in a software program or module (e.g., the operating system 841 or the application 842) within the memory 830. In some embodiments, the processor 822 can include one or more processing cores.

The network interface 850 is configured to provide and control network interfaces of the apparatus 800 that are used to interact with other network devices (e.g., acceleration nodes). The network interface 850 can include, for example, a standard wired interface and a standard wireless interface (e.g., a Wi-Fi interface). In some embodiments, the network interface 850 is used for connecting one or more acceleration nodes and performing data communication (e.g., data carrying routing information) with the one or more acceleration nodes. In some embodiments, operations of network interface 850 are controlled by instructions or code stored in the operating system 841 in the memory 830. Additionally, in some embodiments, the apparatus 800 can also be run at a remote location via a network such as, for example, the Internet. For example, the apparatus 800 can be connected to set of acceleration nodes via the Internet through the network interface 850.

The input/output interface 858 is configured to provide and control input/output interfaces that are used to interact with the acceleration nodes and/or an operator of the apparatus 800. Such an input/output interface can be, for example, a display device (e.g., a monitor, a screen), an input device (e.g., a keyboard, a mouse), and/or other input/output devices (e.g., a printer, a speaker, a light, an alarm, etc.). In some embodiments, operations of the input/output interface 858 are controlled by instructions or code stored in the operating system 841 in the memory 830.

The memory 830 can include, for example, a random-access memory (RAM) (e.g., a DRAM, a SRAM, a DDR RAM, etc.), a read-only memory (ROM), a non-volatile memory such as one or more magnetic disk storage devices, optical disk storage devices, flash memory devices, or other non-volatile solid state storage devices. In some embodiments, the memory 830 can include one or more storage devices (e.g., a removable memory) remotely located from other components of the apparatus 800. In some embodiments, the memory 830 can be any type of memory device (e.g., flash memory device, removable memory device, magnetic disk storage device, optical disk storage device, etc.) configured to store modules, programs, applications of the apparatus 800. In some embodiments, the memory 830 can include computer readable mediums such as, for example, a hard disk or CD-ROM driver. As shown in FIG. 8, the memory 830 includes at least the operating system 841, the data 844 and the application 842.

Without loss of generality, the mentioned computer readable medium can include computer memory medium and communication medium. The computer memory medium includes volatile and non-volatile, mobile and immobile mediums realized by any method or technology which is configured to store information such as computer readable instruction, data structure, program module or other data. The computer memory medium includes RAM, ROM, EPROM, EEPROM, flash memory or other solid-state storage technologies, CD-ROM, DVD or other optical storages, cassette, magnetic tape, magnetic disk memory or other magnetic memory devices.

In some embodiments, each component, program, application or module included in the memory 830 can be a hardware-based module (e.g., a DSP, a FPGA, an ASIC), a software-based module (e.g., a module of computer code executed at a processor, a set of processor-readable instructions executed at a processor), or a combination of hardware and software modules. Instructions or code of each component, program, application or module can be stored in the memory 830 and executed at the processor 822. In some embodiments, the memory 830 can include more or less components, programs, applications or modules than those shown in FIG. 8.

In some embodiments, the operating system 841 of the apparatus 800 can include, for example, Windows Server™, Mac OS X™, Unix™, Linux™, FreeBSD™, and/or any other operating system. The data 844 is a data storage area of the memory 830 that is configured to store data received, used and/or generated during the use of the apparatus 800 (e.g., routing information, network quality parameter values, probing packets, etc.). The application 842 is a program storage area of the memory 830 configured to store instructions associated with generating and/or disseminating routing information. In other words, instructions stored at the application 842 of the memory 830, when executed by the processor 822, is configured to perform the methods 100, 600 to generate and disseminate routing information to the set of acceleration nodes as shown and described above with respect to FIGS. 1 and 6.

The power supply 826 is used to provide power for the various components of the apparatus 800. The power supply 826 can be, for example, a battery. The power supply 826 can be operatively coupled to the processor 822 via a power management system that controls charging, discharging, power consumption, and/or other functions related to power management. In some embodiments, the power supply 826 can include one or more DC and/or AC power source, recharging system, power failure detection circuit, power converter or inverter, power supply status indicator, and/or the like.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

What is claimed is:

1. A method of disseminating routing information among a set of acceleration nodes, comprising:
   at a computer system having one or more processors and memory for storing programs to be executed by the one or more processors:
      receiving, from the set of acceleration nodes, values of a group of network quality parameters indicating a level of network quality among the set of acceleration nodes and between the set of acceleration nodes and a set of service nodes;
      designating a first acceleration node from the set of acceleration nodes as a first source node, a first service node from the set of service nodes as a first destination node, a second acceleration node from the set of acceleration nodes as a second source node, and a second service node from the set of service nodes as a second destination node, the second acceleration node being different than the first acceleration node;
      determining, based on the values of the group of network quality parameters and from the set of acceleration nodes, a first series of intermediate hop nodes connecting the first source node and the first destination node and a second series of intermediate hop nodes connecting the second source node and the third destination node;
      generating first routing information associated with a first routing path from the first source node to the first destination node via the first series of intermediate hop nodes and second routing information associated with a second routing path from the second source node to the second destination node via the second series of intermediate hop nodes; and
      disseminating the first routing information to the first source node and each intermediate hop node from the first series of intermediate hop nodes and the second routing information to the second source node and each intermediate hop node from the second series of intermediate hop nodes, respectively, such that the first source node and each intermediate hop node from the first series of intermediate hop nodes forward data to the first destination node according to the first routing path and the second source node and each intermediate hop node from the second series of intermediate hop nodes forward data to the second destination node according to the second routing path.

2. The method of claim 1, the method further comprising:
   determining, based on the values of the group of network quality parameters and from the set of acceleration nodes, a third series of intermediate hop nodes connecting the first source node and the second destination node;
   generating third routing information associated with a third routing path from the first source node to the second destination node via the third series of intermediate hop nodes; and
   disseminating the third routing information to the first source node and each intermediate hop node from the third series of intermediate hop nodes such that the first source node and each intermediate hop node from the third series of intermediate hop nodes forward data to the second destination node according to the third routing path.

3. The method of claim 1, wherein the group of network quality parameters includes at least one of a delay parameter and a packet loss rate parameter.

4. The method of claim 1, further comprising obtaining information of rated load at the set of acceleration nodes and bandwidth of the set of acceleration nodes, the determining the first and second series of intermediate hop nodes includes determining the first and second series of intermediate hop nodes based on the information of rated load and bandwidth.

5. The method of claim 1, further comprising detecting abnormal behavior of acceleration nodes from the set of acceleration nodes, the designating the first and second acceleration nodes as the first and second source nodes includes designating the first and second acceleration nodes as the first and second source nodes based on a detection of abnormal behavior of the first and second acceleration nodes.

6. The method of claim 1, further comprising, after designating the first and second acceleration nodes from the set of acceleration nodes as the first and second source nodes, for each service node from the set of service nodes:
   determining, based on the values of the group of network quality parameters and from the set of acceleration nodes, a series of intermediate hop nodes connecting the source node and that service node;
   generating routing information associated with a routing path from the source node to that service node via the series of intermediate hop nodes; and
   disseminating the routing information to the source node and each intermediate hop node from the series of intermediate hop nodes such that the source node and each intermediate hop node from the series of intermediate hop nodes forward data to that service node according to the routing path.

7. A system configured to disseminate routing information, comprising:
a routing computation node configured to receive, from a set of acceleration nodes, values of a group of network quality parameters indicating a level of network quality among the set of acceleration nodes and between the set of acceleration nodes and a set of service nodes, the routing computation node configured to:
designate a first acceleration node from the set of acceleration nodes as a first source node, a first service node from the set of service nodes as a first destination node, a second acceleration node from the set of acceleration nodes as a second source node, and a second service node from the set of service nodes as a second destination node, the second acceleration node being different than the first acceleration node;
determine, based on the values of the group of network quality parameters and from the set of acceleration nodes, a first series of intermediate hop nodes connecting the first source node and the first destination node and a second series of intermediate hop nodes connecting the second source node and the third destination node;
generate, based on the values of the group of network quality parameters, first and second routing information associated with first and second routing paths from the first source node to the first destination node via the first series of intermediate hop nodes and from the second source node to the second destination node via the second series of intermediate hop nodes, respectively, each of the first and second routing paths including multiple intermediate hops;
a routing dissemination node configured to retrieve the generated first and second routing information from the routing computation node, the routing dissemination node configured to disseminate the first routing information to the first source node and each intermediate hop node from the first series of intermediate hop nodes and the second routing information to the second source node and each intermediate hop node from the second series of intermediate hop nodes, respectively, such that the first source node and each intermediate hop node from the first series of intermediate hop nodes forward data to the first destination node according to the first routing path and the second source node and each intermediate hop node from the second series of intermediate hop nodes forward data to the second destination node according to the second routing path; and
the set of acceleration nodes configured to receive service data destined to the set of service nodes, the set of acceleration nodes configured to forward the service data to the destined service node from the set of service nodes based on the routing information received from the routing dissemination node.

8. The system of claim 7, wherein the routing computation node is configured to generate, based on the values of the group of network quality parameters, routing information associated with routing paths from each acceleration node from the set of acceleration nodes to each service node from the set of service nodes via the set of acceleration nodes, each of the routing paths including multiple intermediate hops.

9. The system of claim 7, wherein the group of network quality parameters includes at least one of a delay parameter and a packet loss rate parameter.

10. The system of claim 7, wherein the routing computation node is configured to receive, from the set of acceleration nodes, information of rated load at the set of acceleration nodes and bandwidth of the set of acceleration nodes, the routing computation node is also configured to generate the routing information based on the information of rated load and bandwidth.

11. The system of claim 7, wherein the routing computation node is configured to detect abnormal behavior of acceleration nodes from the set of acceleration nodes, the routing computation module is also configured to designate the first and second acceleration nodes as the first and second source nodes based on a detection of abnormal behavior of the first and second acceleration nodes.

12. An apparatus for operatively coupling to a set of acceleration nodes in a network, the apparatus comprising:
a receiving module configured to receive, from the set of acceleration nodes, values of a group of network quality parameters indicating a level of network quality among the set of acceleration nodes and between the set of acceleration nodes and a set of service nodes;
a routing computation module configured to:
designate a first acceleration node from the set of acceleration nodes as a first source node, a first service node from the set of service nodes as a first destination node, a second acceleration node from the set of acceleration nodes as a second source node, and a second service node from the set of service nodes as a second destination node, the second acceleration node being different than the first acceleration node;
determine, based on the values of the group of network quality parameters and from the set of acceleration nodes, a first series of intermediate hop nodes connecting the first source node and the first destination node and a second series of intermediate hop nodes connecting the second source node and the third destination node;
generate, based on the values of the group of network quality parameters, first and second routing information associated with first and second routing paths from the first source node to the first destination node via the first series of intermediate hop nodes and from the second source node to the second destination node via the second series of intermediate hop nodes, respectively, each of the first and second routing paths including multiple intermediate hops; and
a routing dissemination module configured to disseminate the first routing information to the first source node and each intermediate hop node from the first series of intermediate hop nodes and the second routing information to the second source node and each intermediate hop node from the second series of intermediate hop nodes, respectively, such that the first source node and each intermediate hop node from the first series of intermediate hop nodes forward data to the first destination node according to the first routing path and the second source node and each intermediate hop node from the second series of intermediate hop nodes forward data to the second destination node according to the second routing path.

13. The apparatus of claim 12, wherein the routing computation module is configured to generate, based on the values of the group of network quality parameters, routing information associated with routing paths from each acceleration node from the set of acceleration nodes to each service node from the set of service nodes via the set of acceleration nodes, each of the routing paths including multiple intermediate hops.

14. The apparatus of claim 12, wherein the group of network quality parameters includes at least one of a delay parameter and a packet loss rate parameter.

15. The apparatus of claim 12, wherein the routing computation module is configured to receive, from the set of acceleration nodes, information of rated load at the set of acceleration nodes and bandwidth of the set of acceleration nodes, the routing computation module is also configured to generate the routing information based on the information of rated load and bandwidth.

16. The apparatus of claim 12, wherein the routing computation module is configured to detect abnormal behavior of acceleration nodes from the set of acceleration nodes, the routing computation module is also configured to designate the first and second acceleration nodes as the first and second source nodes based on a detection of abnormal behavior of the first and second acceleration nodes.

* * * * *